(12) United States Patent  (10) Patent No.: US 9,276,967 B2
Casey et al.  (45) Date of Patent: Mar. 1, 2016

(54) SYSTEM AND METHOD FOR DETERMINING OPTIMAL BANDWIDTH FOR STREAMING TO A CLIENT DEVICE IN AN ADJUSTABLE BIT RATE VIDEO SYSTEM

(75) Inventors: Steven M. Casey, Littleton, CO (US); Felipe Castro, Erie, CO (US); Ronnie Dhaliwal, Aurora, CO (US); Hong Choi, Denver, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 376 days.

(21) Appl. No.: 13/559,835

(22) Filed: Jul. 27, 2012

(65) Prior Publication Data

US 2014/0032781 A1  Jan. 30, 2014

(51) Int. Cl.
| | |
|---|---|
| G06F 15/16 | (2006.01) |
| H04L 29/06 | (2006.01) |
| H04L 12/801 | (2013.01) |
| H04L 12/54 | (2013.01) |
| H04N 21/2662 | (2011.01) |
| H04N 21/2343 | (2011.01) |
| H04N 21/239 | (2011.01) |
| H04N 21/24 | (2011.01) |
| H04L 12/815 | (2013.01) |

(52) U.S. Cl.
CPC ........ *H04L 65/1069* (2013.01); *H04L 12/5695* (2013.01); *H04L 29/06027* (2013.01); *H04L 47/10* (2013.01); *H04L 47/22* (2013.01); *H04L 65/60* (2013.01); *H04L 65/80* (2013.01); *H04N 21/2393* (2013.01); *H04N 21/23439* (2013.01); *H04N 21/2402* (2013.01); *H04N 21/2662* (2013.01)

(58) Field of Classification Search
None
See application file for complete search history.

(56) References Cited

U.S. PATENT DOCUMENTS

| | | | | |
|---|---|---|---|---|
| 5,790,792 | A  * | 8/1998 | Dudgeon | H04L 29/06 709/212 |
| 5,931,913 | A  * | 8/1999 | Meriwether | H04L 29/06 709/227 |
| 6,108,307 | A    | 8/2000 | McConnell et al. | |
| 6,473,793 | B1   | 10/2002 | Dillon et al. | |
| 7,039,015 | B1   | 5/2006 | Vallone et al. | |
| 7,058,721 | B1 * | 6/2006 | Ellison | G11B 27/031 348/E5.008 |
| 7,116,682 | B1 * | 10/2006 | Waclawsky | H04J 3/1682 370/468 |
| 7,277,637 | B2 * | 10/2007 | Jette | H04J 14/02 398/63 |
| 7,493,407 | B2 * | 2/2009 | Leedom | H04L 12/5695 709/224 |
| 7,512,698 | B1 * | 3/2009 | Pawson | G11B 27/031 709/224 |
| 7,688,731 | B2   | 3/2010 | Haumont et al. | |

(Continued)

OTHER PUBLICATIONS

J. Gross, J. Klaue, H. Karl, A. Wolisz—"Cross-layer Optimization of OFDM Transmission Systems for MPEG-4 Video Streaming" (Computer Communications, 2004).*

(Continued)

*Primary Examiner* — Mohamed Ibrahim
*Assistant Examiner* — James Fiorillo
(74) *Attorney, Agent, or Firm* — Swanson & Bratschun, L.L.C.

(57) ABSTRACT

A system and method for selecting an initial bandwidth setting. A determination is made that a client is initiating a communication session. Network conditions for the client are determined. A bandwidth setting for the client is selected utilizing the network conditions and a previous bandwidth setting saved in a memory. The communication session for the client is initiated utilizing the bandwidth seating.

20 Claims, 4 Drawing Sheets

(56) References Cited

U.S. PATENT DOCUMENTS

| | | | | |
|---|---|---|---|---|
| 7,702,816 B2* | 4/2010 | Narayanan | H04L 12/5695 | 709/227 |
| 7,743,183 B2* | 6/2010 | Virdi | H04L 29/06027 | 365/189.05 |
| 7,826,496 B2* | 11/2010 | Gatto | H04L 29/06 | 370/230 |
| 7,978,628 B2 | 7/2011 | Bugenhagen | | |
| 8,059,559 B2 | 11/2011 | Bugenhagen | | |
| 8,409,000 B1* | 4/2013 | Colaco | A63F 9/24 | 463/31 |
| 8,681,621 B2 | 3/2014 | Bugenhagen | | |
| 2002/0025795 A1* | 2/2002 | Sharon | H04L 12/14 | 455/405 |
| 2005/0213586 A1* | 9/2005 | Cyganski | H04L 41/0896 | 370/395.41 |
| 2006/0282566 A1* | 12/2006 | Virdi | H04L 29/06027 | 710/52 |
| 2007/0025301 A1* | 2/2007 | Petersson | H04L 47/10 | 370/338 |
| 2007/0081453 A1* | 4/2007 | Hsu | H04L 47/10 | 370/229 |
| 2008/0049638 A1* | 2/2008 | Ray | H04L 41/0896 | 370/252 |
| 2008/0052401 A1* | 2/2008 | Bugenhagen | H04L 12/14 | 709/227 |
| 2008/0301107 A1 | 12/2008 | Shuster | | |
| 2009/0193137 A1* | 7/2009 | Pawson | H04N 21/2343 | 709/231 |
| 2010/0054123 A1* | 3/2010 | Yong | H04L 43/0864 | 370/230 |
| 2010/0287298 A1* | 11/2010 | Leung | H04H 20/16 | 709/232 |
| 2010/0299552 A1* | 11/2010 | Schlack | H04L 47/10 | 714/4.1 |
| 2010/0318670 A1* | 12/2010 | Al-Shalash | H04W 76/02 | 709/229 |
| 2012/0191869 A1* | 7/2012 | Chauvin | H04N 21/2387 | 709/231 |
| 2012/0259950 A1* | 10/2012 | Havekes | H04L 65/4084 | 709/217 |
| 2012/0265856 A1* | 10/2012 | Major | H04N 21/2225 | 709/219 |
| 2012/0300646 A1* | 11/2012 | Sloyer | H04L 12/1827 | 370/252 |
| 2012/0311173 A1* | 12/2012 | Agarwal | H04L 43/0829 | 709/231 |
| 2013/0013754 A1* | 1/2013 | Brown | H04L 41/0806 | 709/221 |
| 2013/0051276 A1* | 2/2013 | Pantelias | H04L 41/0896 | 370/253 |
| 2013/0067112 A1* | 3/2013 | Delos Reyes | H04W 28/0226 | 709/239 |
| 2013/0139091 A1* | 5/2013 | Raciborski | H04L 67/06 | 715/772 |
| 2013/0151580 A1* | 6/2013 | Singh | H04L 67/02 | 709/201 |
| 2013/0159498 A1* | 6/2013 | Funge | H04N 21/44218 | 709/224 |
| 2013/0246576 A1* | 9/2013 | Wogsberg | H04N 7/181 | 709/219 |
| 2013/0290557 A1* | 10/2013 | Baratz | H04L 65/60 | 709/231 |
| 2013/0339529 A1* | 12/2013 | Rizzo | H04L 29/0845 | 709/226 |
| 2014/0012971 A1* | 1/2014 | Eichen | H04L 47/801 | 709/224 |
| 2014/0032781 A1* | 1/2014 | Casey | H04N 21/2662 | 709/233 |
| 2014/0237118 A1* | 8/2014 | Matthews | H04L 47/2441 | 709/226 |
| 2014/0247719 A1 | 9/2014 | Bugenhagen | | |

OTHER PUBLICATIONS

Guan-Ming Su, Min Wu—"Efficient Bandwidth Resource Allocation for Low-Delay Multiuser Video Streaming" (IEEE Transactions on Circuits and Systems for Video Technology, vol. 15, No. 9, Sep. 2005).*

Yao Liang, "Real-time VBR Video Traffic Prediction for Dynamic Bandwidth Allocation" (IEEE Transactions on Systems Man, and Cybernetics—Part C:Applications and Reviews, vol. 34, No. 1, Feb. 2004).*

Qian Zhang, Ya-Qin Zhang, "Resource Allocation for Multimedia Streaming Over the Internet" (IEEE Transactions on Multimedia, vol. 3, No. 3, Sep. 2001.*

Xiabo Zhou, Cheng-Zhong Xu, "Harmonic Proportional Bandwidth Allocation and Scheduling for Service Differentiation on Streaming Servers" (IEEE Transactions on Parallel and Distributed Systems, vol. 15, No. 9, Sep. 2004).*

U.S. Appl. No. 13/247,880; Notice of Allowance dated Feb. 27, 2014; 20 pages.

U.S. Appl. No. 14/196,671; Notice of Publication dated Sep. 4, 2014; 1 page.

U.S. Appl. No. 14/196,671; Notice of Allowance dated Jan. 12, 2016; 1 page.

* cited by examiner

SYSTEM AND METHOD FOR DETERMINING OPTIMAL BANDWIDTH FOR STREAMING TO A CLIENT DEVICE IN AN ADJUSTABLE BIT RATE VIDEO SYSTEM

BACKGROUND

The use of and development of communications has grown nearly exponentially in recent years. The growth is fueled by larger networks with more reliable protocols and better communications hardware available to service providers and consumers.

Despite the many technological advances, most users of communications services are still limited by traditional streaming services. In particular, users are commonly charged a monthly flat rate for data services, such as a specified or guaranteed amount of bandwidth. The bandwidth provided by the communications service provider may limit the user's activities or ineffectively utilize the communication service provider's network and available bandwidth. When a communication session, such as streaming video is initiated, the communications service provider or clients utilized by the user, may use a best guess approach to setting the initial bandwidth settings. In many instances it may take time before the clients or communications service provider adjust to the ideal bandwidth often resulting in a blurry picture, underutilization of bandwidth and processing resources, and other similar problems. As a result, current systems and services may be inefficient for both the user and the communications service provider.

SUMMARY

One embodiment includes a system and method for selecting an initial bandwidth setting. A determination may be made that a client is initiating a communication session. Network conditions for the client may be determined. A bandwidth setting for the client may be selected utilizing the network conditions and a previous bandwidth setting saved in a memory. The communication session for the client may be initiated utilizing the bandwidth setting.

Another embodiment includes a system for retrieving a bandwidth setting. The system may include a server configured to determine a client is initiating a communication session, determine an identifier associated with the client, and select a bandwidth setting for the client utilizing the identifier associated with the client and a previous bandwidth setting utilized by the client. The system may further include a database in communication with the server. The database may be operable to store the previous bandwidth setting utilised by the client.

Yet another embodiment provides a server for selecting a bandwidth setting. The server may include a processor for executing a set of instructions and a memory for storing the set of instructions. The set of instructions may be configured to determine a client is initiating a communication session, determine an identifier associated with the client, determine network conditions for the client, select a bandwidth setting for the client utilizing the network conditions and the identifier associated with the client, wherein the identifier is associated with a previous bandwidth setting saved in a memory, and initiate the communication session for the client utilizing the bandwidth setting.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system, method, and device for selecting a bandwidth setting from one of multiple bandwidth settings, profiles, or bit rates. An optimal bandwidth setting is utilized to initiate streaming communications. The streaming communications may be for video, data, telephonic, or other non-real-time or real-time communications, downloads, or streams. The bandwidth setting may be utilized for client devices, media players, or applications. The adaptive bit rate for videos, images, or streaming content may be stored and updated in real-time for concurrent or future reference. The bandwidth setting is particularly useful for initial content requests, transitions between video streams, new applications being opened, and so forth.

In one embodiment, the bandwidth settings are recorded or stored to a central location available to a number of devices and applications for easy access, such as a bandwidth storage server. Any number of changes in network conditions, buffer utilization, or bandwidth availability may prompt the bandwidth setting to be saved. In one embodiment, the bandwidth setting may be saved periodically or in response to specific conditions or events being met. The previous utilized bandwidth setting may be saved locally or remotely for both hardware and software access. For example, the bandwidth setting may be saved in a modem utilized by a local wireless network. The devices and applications may more easily determine an initial bandwidth setting to enhance bandwidth utilization and the user experience. The adaptive bit rate utilized may be increased or decreased in response to current conditions (e.g. network conditions such as available bandwidth, latency, delay, error rates, etc), buffer utilization, and so forth resulting in the bandwidth setting being saved.

Figure 1:
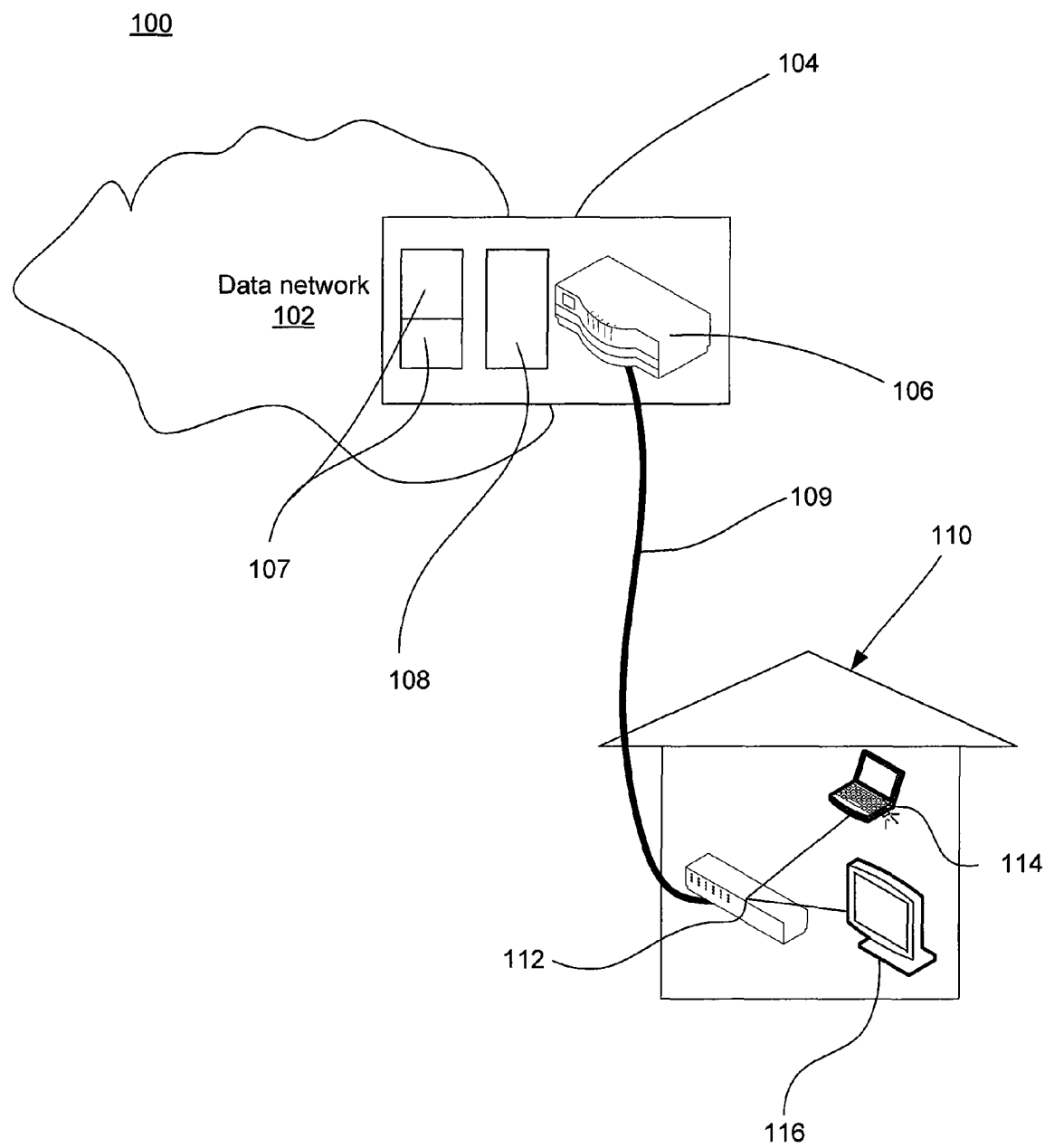
FIG. 1 is a pictorial representation of a communications environment in accordance with an illustrative embodiment.

FIG. 1 is a pictorial representation of a communications environment 100 in accordance with an illustrative embodiment. The communications environment 100 of FIG. 1 is the system, environment, devices, and settings utilized for data communications. In one embodiment, the communications environment 100 may include a data network 102, a communications management system 104, a network device 106, databases 107, a utilization server 108, connection 109, a customer 110, a router 112, and clients 114 and 116.

The data network 102 is a network and system for communicating data, packets, and other information between any number of points, individual users, businesses, organizations or other communicating parties. For example, the data network 102 may be a content delivery network for delivering streaming video (including audio, and other communications). The data network 102 represents one or more data networks, such as public, cloud, private, virtual, or other types of networks that may be interconnected. For example, the data network 102 may represent a number of networks interconnected in a cloud configuration including numerous server farms, fiber optic connections, and other network devices as are known in the art.

The data network 102 may be provided or managed by a communications service provider. The communications service provider may provide data services for multiple users or customers which may include the customer 110. The data network 102 may include any number of devices, physical connections, elements or wireless systems in addition to the communications management system 104, network device 106, and utilization server 108. Similarly, any number of communications service providers may manage the data network 102.

In one embodiment, the data network 102 may provide any number of data services, including Internet Protocol (IP), streaming video, Ethernet, metro Ethernet, digital subscriber line (DSL), ATM, Frame Relay, data over cable service interface specifications (DOCSIS) or other similar data connections for users registered to receive the services. The communications management system 104 is the device or network components that manages communications for all or portions of the data network 102. The communications management system 104 may include any number of switches, servers, routers, databases, processing systems, and other elements utilized to enable data communications for the customer 110. As illustrated herein, the communications management system 104 includes the network device 106, databases 107, and the utilization server 108.

The network device 106 is any computing or communications device of the communications service provider or user. In one embodiment, the network device 106 is the last device (or network edge device) that is integrated with the data network 102 before connecting to a device or element utilized by a user shown as the customer 110 in FIG. 1. The network device 106 may be positioned on the outer-most part of the data network 102. In one embodiment, the network device 106 may set the initial bandwidth settings of the customer 110 and may manage bandwidth utilized or available to the customer 110. For example, the network device 106 may be a bandwidth storage server.

The network device 106 may be one or more servers, routers, switches or intelligent network devices managing data flow to the customer 110. However, the network device 106 may be any device suitable for managing communications between a data network 102 provided by a communications service provider and the user as represented by the customer 110. In one embodiment, the network device 106 or communications management system 104 may include or be connected to one of the databases 107 for storing a previous bandwidth setting for each of the clients 114 and 116 (as well as a number of other communications or computing devices of the communications environment 100).

The bandwidth setting may be accessible to the customer 110 through the connection 109 through a query, web service call, pointer, IP address, URL, http reference, or other request for the bandwidth setting. The bandwidth setting may be stored as a file, cookie, database entry, register, or in other accessible formats. In one embodiment, the bandwidth setting may identify the communications service provider, type of connection, connection, customer information, client identifier, application identifier, time stamp, user preferences regarding bandwidth allocation, and other relevant information. In one embodiment, the clients or applications utilized by the customer 110 may be automatically or manually updated to retrieve the bandwidth setting from the network device 106.

The databases 107 may also store video and advertising content for streaming to the customer 110. The bandwidth settings may be utilized when transitioning between video content, segments, clients, or applications. For example, http live streaming and http smooth streaming (e.g. Apple HLS, Microsoft HSS, etc) may break a stream into smaller files, segments, sequences, or fragments, such as http based files, for playback by a client. The databases 107 in communication with the utilization server 108 may also store a manifest of files that are available based on the bandwidth setting (a manifest file may describe the segments and order). The files may include segmented video files for a video clip, movie, real-time content, television show, or advertisements. In one embodiment, the advertisements may be stored separately for insertion. As a result, the video utilized may be streamed specifically based on the bandwidth setting.

For example, the bandwidth settings (or adjustable bit rates) for the clients 114 and 116 may vary between 2 Mb/s, 1.5 Mb/s, 700 Kb/s, and 250 kb/s. For a first video named video1, the files (e.g. ten second segments) associated with the 2 Mb/s setting may be stored in the manifest as video1_1_2 Mbps, video1_2_2 Mbps, video1_3_2 Mbps, video1_4_2 Mbps ... video1_$n$_2 Mb/s. The files for the other bandwidth settings may similarly be video1_1_1.5 Mbps ... video1_$n$_1.5 Mbps, video1_1_700 Kbps ... video1_$n$_Kbps, and video1_1_250 kbps ... video1_$n$_250 kbps.

In one embodiment, the utilization server 108 is a server configured to track the bandwidth settings utilized by clients and applications associated with the customer 110. The utilization server 108 may also track utilization of the connection 109 and data network 102. For example, the utilization server 108 may be able to determine congestion, latency, utilized bandwidth and available bandwidth. In one embodiment, the clients 114 or 116 (or applications being executed thereon) may select the initial bandwidth setting. For example, the clients 114 or 116 may utilize a previous bandwidth setting that was most frequently used by the clients 114 or 116 (or that was recently used successfully) as well as available bandwidth through the connection 109.

In another embodiment, the network device 106 or other device of the data network 102 may make the determination regarding the initial bandwidth setting before communicating the initial bandwidth setting to either of the clients 114 or 116. For example, a bandwidth setting or bandwidth profile may be stored in any device or component of the communications management system 104.

As noted, the clients 114 and 116, router 112, network device 106, utilization server 108, or other network device may store the bandwidth settings as a file (e.g. bandwidth file that is time stamped), cookie, or other data. The bandwidth settings may be stored in a location that is uniformly accessible by a number of applications. In addition, buffer utilization and a bandwidth history may be stored. The previous bandwidth setting may be saved as an XML, csv, txt, or other file format. In one embodiment, a communications service provider may store the bandwidth setting to distribute to the clients 114 and 116. For example, the bandwidth settings may be utilized, distributed, or retrieved during transitions between video content, data connections, applications, or client devices.

The customer 110 is a user of the communications service provider operating the data network 102. The customer 110 may also be an individual, business, association, government entity, family, organization, group or other data services customer. The customer 110 may be housed in one or more buildings and may receive all data communications through the router 112.

The router 112 is a device configured to route data communications to the clients 114 and 116. However, the router 112 may be a server, set-top box, wireless network device or other element suitable for receiving and routing communications to the clients 114 and 116. In one embodiment, the router 112 may be a WiFi® router configured to communicate with the clients using a wireless standard or proprietary protocol. In another embodiment, the router 112 may be an integrated portion of a local area network utilized by the customer 110.

The router 112 may also represent a modem utilized for data communications by the customer 110 (including clients 114 and 116). In one embodiment, the clients 114 and 116 (or customer 110) may select any number of compatible bandwidth settings or bandwidth profiles that are stored locally or remotely, such as in the router 112 or network device 106, for implementation. For example, the router 112 may include a memory for storing historical bandwidth setting information for at least the clients 114 and 116. Logic, instructions, or an application may be utilized by the router 112 and clients 114 and 116 to both synchronize or save bandwidth settings periodically (i.e. every two minutes) and retrieve the previously used bandwidth settings.

The clients 114 and 116 are communications or computing devices operable to send and receive data communications. The clients 114 and 116 represent any number of devices or elements that may communicate through the connection 109. For example, the clients 114 and 116 may include: laptops, personal computers, set-top boxes, servers, wireless devices, PDAs, Blackberry®, voice over IP telephones, or other similar communications devices. For example, the client 116 may represent a set-top box and display that are connected or integrated. In one embodiment, the bandwidth settings may be adjusted up or down based on the number of clients 114 and 116 that utilize a network or data connection or based on user preferences.

The connection 109 is a data connection between the customer 110 and the data network 102. For example, the connection 109 may provide the customer 110 access to the Internet, any number of local area networks, private networks, virtual private networks, networks, devices or other communications service providers available through the connection 109. The connection 109 may be physically represented by a fiber optic connection, category 6 cable, coaxial cable, telephone line, wireless network or other communications line connecting the network device 106 and the router 112 which may include both large-scale and small-scale connections.

Figure 2:
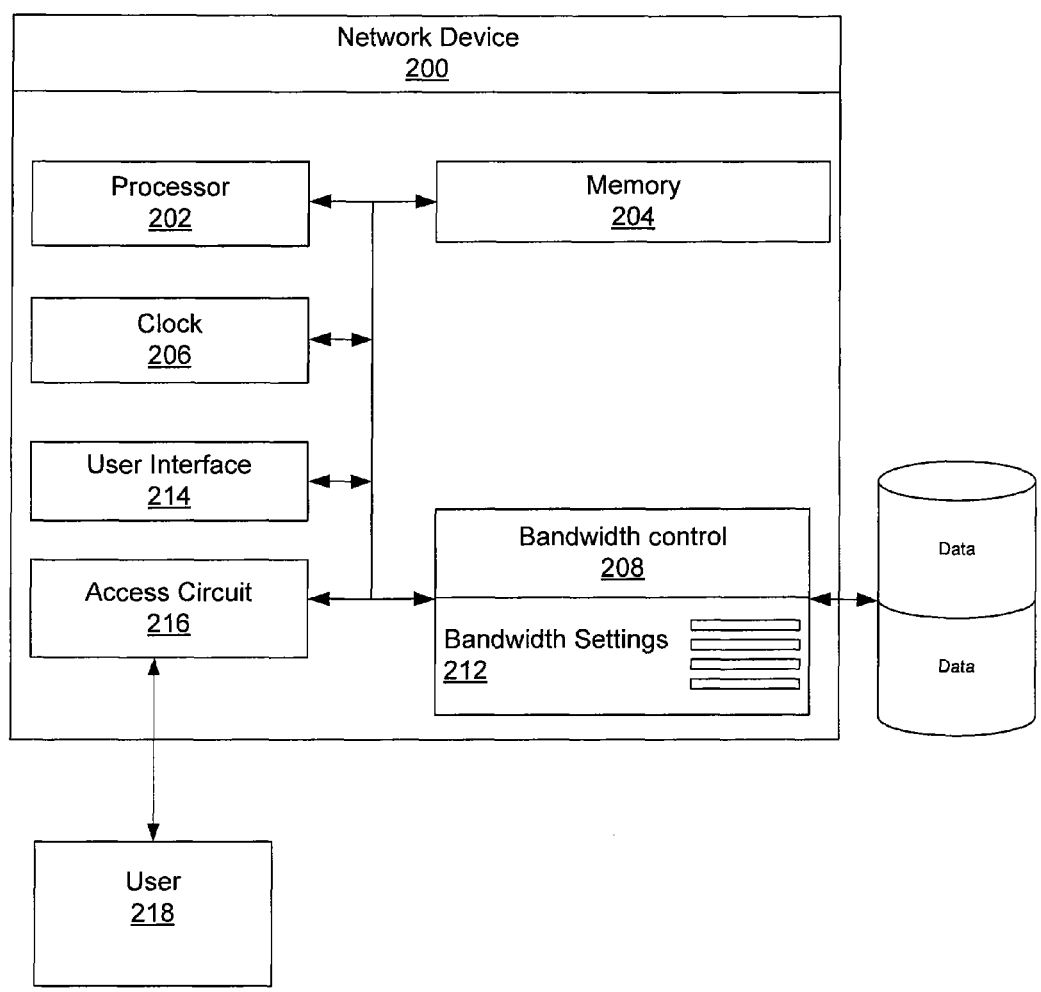
FIG. 2 is a block diagram of a network device in accordance with an illustrative embodiment.

FIG. 2 is a block diagram of a network device 200 in accordance with an illustrative embodiment. The network device 200 and the user 218 are particular implementations of the network device 106 and the customer 110 of FIG. 1, respectively. The network device 200 may include any number of hardware, software, and firmware components which may include a processor 202, a memory 204, a clock 206, a bandwidth control 208, bandwidth settings 212, a user interface 214, and an access circuit 216. The network device 200 may manage bandwidth and communications for one or more individuals, groups, organizations or businesses, including a user 218.

The processor 202 is circuitry or logic enabled to control execution of a set of instructions. The processor 202 may be a microprocessor, digital signal processor, central processing unit, or other device suitable for controlling an electronic device including one or more hardware and software elements, executing software, instructions, programs and applications, converting and processing signals and information, and performing other related tasks. The different elements of the network device 200 may be integrated or communicated through leads, wires, busses, sockets, cards or other interfaces. The processor 202 may be a single chip or integrated with other computing or communications elements. In one embodiment, the processor 202 may function with the bandwidth 208 control to manage the bandwidth settings and available bandwidth allotted to the user 218 through the access circuit.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage or configuration suitable as storage for data, instructions, and information. In one embodiment, the memory 204 and processor 202 may be integrated. The memory may use any type of volatile or non-volatile storage configurations, techniques, and mediums. In one embodiment, the memory 204 may store the current selection of a bandwidth setting.

The clock 206 is a device or software module for tracking and measuring the current time. In one embodiment, the clock 206 is a stratum clock that directly or indirectly receives a time signal indicating the current time from the United States Naval Observatory or equivalent organization. The clock 206 may be enabled to synchronize the current time with one or more other timekeeping elements or clocks. Additionally, the clock 206 may keep and track the current time independently for purposes of autonomy or as needed. The clock 206 may be important because the different bandwidth settings 212 may be initiated to increase or decrease the available bandwidth based on a time-based service plan.

The network device 200 may also use buffer fill or utilization to report or save the bandwidth setting. For example, if the buffer fill is overloaded (e.g. resulting in blurriness), the bandwidth setting 212 may be decreased to a lower level and the bandwidth setting may be written to a log. If, however, the buffer fill is under loaded (e.g. low utilization of bandwidth and lower resolution), the bandwidth settings 212 may be increased to the next bandwidth setting.

The bandwidth settings 212 include information that controls a bandwidth available and allocated to the user 218 by the network device 200. The bandwidth settings 212 may include any number of profiles or settings that may automatically implemented or selected by the user 218 and implemented by the network device 200. For example, the bandwidth settings or profiles for a media player may include profile 1 for 3 Mb/s, profile 2 for 1.5 Mb/s, profile 3 for 700 Kb/s, and profile 4 for 300 Kb/s. The most recently utilized bandwidth settings 212 may be saved to one or more locations and include information, such as client identification—AEX3823, communication type—streaming video, bandwidth—4.96 Mb/s, time—3:20 UTC, date—Jun. 17, 2018, change in bandwidth—±10%, and network connection—WiFi.

In some cases, the bandwidth settings or profiles utilized by the communications service provider and content provider may vary. As a result, the bandwidth settings may be matched up as closely as possible to maximize bandwidth. In one embodiment, the client player may determine that 4.96 Mb/s are available through the communications service provider, however, the content provider may limit bandwidth to 3 Mb/s. The bandwidth setting available through the communications service provider (e.g. 4.96 Mb/s) is saved in the central location for other devices. As a result, other media players or video may be streamed at the higher rate if there are not limitations or conditions on the bandwidth available. For example, the client player may switch to a content provider (e.g. advertiser) and associated video stream that may stream content at 4.5 Mb/s more closely matching the saved bandwidth setting that is initially used of 4.96 Mb/s.

In another embodiment, the user 218 may utilize another network device in communication with the network device 200 in order to make the selection of the bandwidth settings 212. In one embodiment, the user interface 214 may allow the user 218 to update one or more of the bandwidth settings 212 via cell phone. In another embodiment, the user 218 may communicate with a database through a web server that allows the user 218 to upgrade the bandwidth settings 212 selected for implementation by the network device 200 using a network connection.

The user interface 214 is an interface for receiving user input. The user interface 214 may be a graphical user interface (GUI), interactive voice response system, web page or other interface element or devices. The user interface 214 may be accessible using a user name, password, account number or any other identifiers that allow the user 218 to authenticate the changes made to the bandwidth settings 212. The user interface 214 may be available through any number of computing or telecommunications devices, including personal computers, servers, laptops, routers, wireless devices, virtual tunnels, modules or other elements. The user interface 214 may allow the user 218 to select or change the bandwidth setting based on previous experiences. For example, based on the user's needs, an initial bandwidth setting may be immediately selected and initiated.

The bandwidth control 208 or controller is the logic or circuitry for controlling the bandwidth allocated to the user 218. In one embodiment, the bandwidth control 208 is a bandwidth manager that is configured to manage and control the bandwidth settings 212 utilized as well as manage reporting to clients that request a bandwidth setting. For example, the bandwidth control 208 may synchronize the bandwidth settings 212 between local devices and network devices. The synchronized bandwidth settings may be utilized when a client experiences a hand-off between networks, such as between a WiFI network and a cellular/wireless data network. In one embodiment, the bandwidth control 208 sends commands to the access circuit 216. The access circuit 216 is the logic and circuitry that increases or decreases the bandwidth allocated to the user 218. The access circuit 216 may be connected to the user 218 through a communication line or link. In one embodiment, the data information and packets communicated by the user 218 are channeled through the access circuit 216.

In one embodiment, the bandwidth control 208 may set the bandwidth settings 212 utilizing all available bandwidth to set the bandwidth settings. In another embodiment, the bandwidth control 208 may allocate bandwidth utilizing a number of anticipated devices accessing a network connection (and their expected bandwidth utilization). For example, the available bandwidth may be 4 Mb/s, but usage information may indicate that the user, business, household, or organization typically has four devices connected at a time. As a result, the bandwidth control 208 may allocate 1 Mb/s to each device as the device/user begins communications.

The bandwidth allocation process (including setting initial bandwidth settings) may occur automatically using historical information, such as average devices in use, time of day usage for the devices, and other factors. In another embodiment, the user interface 214 may allow a user to manually specify the bandwidth available to each device or client. The user specifications may include conditions, such as priority devices/clients, time of day allowances, and other criteria that specify the bandwidth allocated and the associated initial bandwidth settings.

The clock 206, bandwidth control 208, bandwidth settings 212, user interface 214, and access circuit 216 may be implemented as software modules, digital logic, firmware or hardware within or external to the network device 200 in order to manage, control, and physically allocate the bandwidth available to the user 218.

The access circuit 216 may utilize any number of physical layer access methods to allocate the bandwidth through one or more circuits, connections or other devices. For example, the access circuit 216 may utilize TCP/IP protocols to send and receive data with the user 218. However, any standards or protocols available for data communication may be utilized between the access circuit 216 and the user 218. As previously described, information received from the user 218 may be routed through the access circuit 216 to any number of other network devices, trunks, communications lines or other users.

Figure 3:
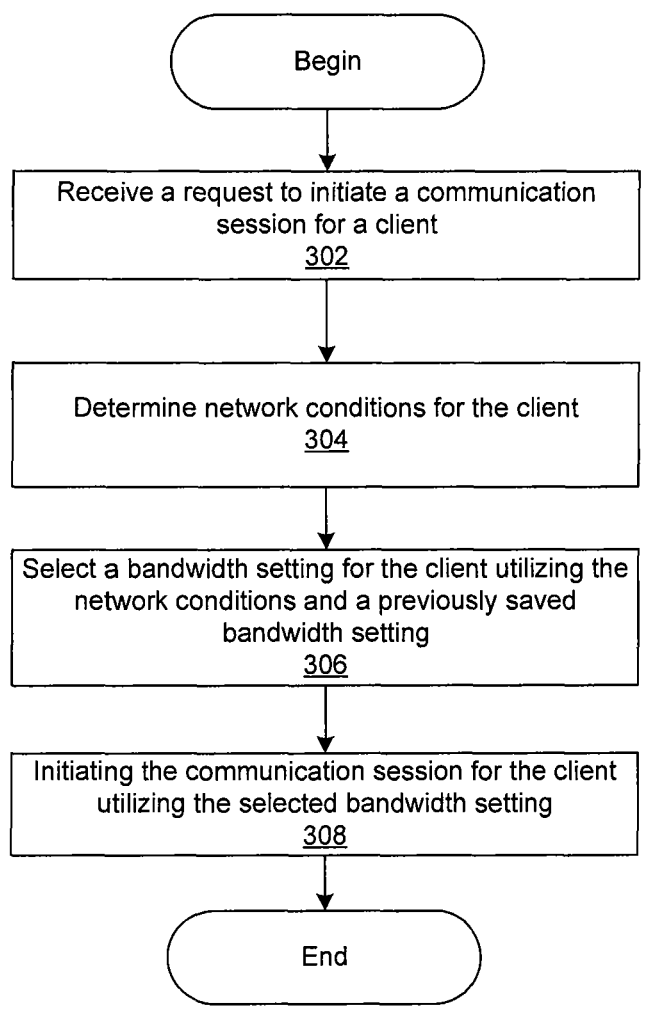
FIG. 3 is an flowchart of a process for establishing an initial bandwidth setting in accordance with an illustrative embodiment.

FIG. 3 is a flowchart of a process for setting an initial bandwidth setting in accordance with an illustrative embodiment. The process of FIG. 3 may be implemented by any number of systems or devices, such as a computing device, client, wireless communications device, program, application, operating system kernel, modem, router, server, streaming device, gaming device, or other network device or set of instructions referred to herein as a "system".

The process of FIG. 3 may begin by receiving a request to initiate a communication session for a client (step 302). The request may be automatically initiated in response to an application being opened, a device being powered on, a requested communication, a request for content, or so forth. For example, the request may be generated in response to a video stream transitioning to a pre-defined or scheduled video advertisement. The request may also be generated based on a user selection or request, such as a request for video content.

In one embodiment, the request may include an identifier identifying the application, network connection, or client. In another embodiment, a request for an identifier may be sent in response to the request. The identifier may be a MAC address, IP address, IMEI, driver identifier, or other unique identifier.

Next, the system determines network conditions for the client (step 304). The network conditions may be determined for the identified client. The network conditions may include one or more network connections or network conditions through which the client receives communications. For example, the network conditions may include latency, delay, jitter, error rates, and other similar network conditions and characteristics.

Next, the system selects a bandwidth setting for the client utilizing the network conditions and a previously saved bandwidth setting (step 306). In one embodiment, one or more databases, servers, or memories may store previously utilized bandwidth settings. The previously utilized bandwidth settings may be time stamped and may indicate a type of communication session. For example, communications sessions involving streaming video may differ from a communication session involving voice over Internet protocol (VoIP). The bandwidth settings may also include categories for low, medium, and high bandwidth availability.

In one embodiment, the client may query one or more devices or databases to determine the previously saved bandwidth settings. The query may return one or more results that are utilized by the client. For example, the query may specify multiple bandwidth settings that are utilized based on conditions, such as time of day, type of communication session, current bandwidth utilization, and network conditions. The previous bandwidth settings may be utilized to enhance the user experience and maximize hardware and software resources by more quickly dialing in on the optimal bandwidth. As a result, less time buffering or utilizing excessively low resolution may be needed.

Next, the system initiates the communication session for the client utilizing the selected bandwidth setting (step 308). In one embodiment, the process of FIG. 3 may be repeated at intervals, such as a refresh interval, to determine that the communication session is still being streamed at an optimal bandwidth setting. In one embodiment, the bandwidth settings, such as the adjustable bit rate, utilized by a dynamic application are updated to a bandwidth storage server and database during utilization. The bandwidth setting may then be stored for centralized access during transitions between video streams and applications, after failures or crashes, or whenever needed.

In one embodiment, the process of FIG. 3 may be implemented repeatedly. For example, the process of FIG. 3 may be implemented each time there is a change of streaming content, such as between streaming video of a media file and a transition to a video advertisement streamed to the client. In one embodiment, the transition between communications sessions or video content may occur on a single client (e.g. a single iPad, streaming application). In another embodiment, the transition may occur between different clients (e.g. different streaming applications).

The illustrative embodiments provide a system and method for setting a bandwidth setting or bit rate that is not a "best guess." As a result, the client may more quickly go to an appropriate bandwidth setting improving the experience of the user. The bandwidth setting is selected utilizing previous historical information and current network conditions and then adjusted as needed rather than guessing and then adjusting. As a result, transitions between streaming video happens smoothly and the user experience is improved.

Figure 4:
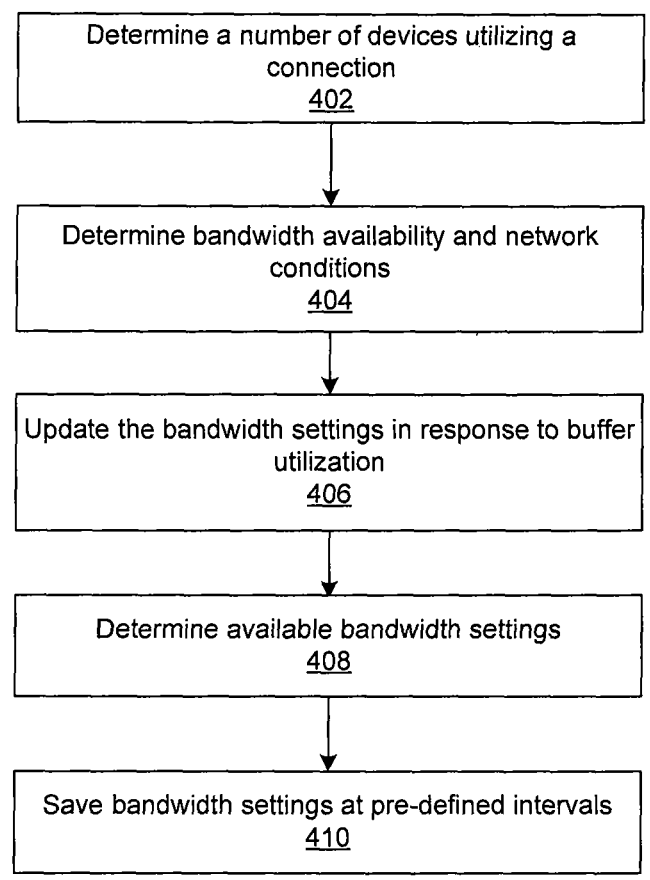
FIG. 4 is a flowchart of a process for determining conditions for setting the initial bandwidth setting in accordance with an illustrative embodiment.

FIG. 4 is a flowchart of determining conditions for setting an initial bandwidth setting in accordance with an illustrative embodiment. The process of FIG. 4 may be utilized to analyze real-time, current, or historical information. In one embodiment, the bandwidth settings saved in a location for a number of devices may be saved during or after any of the steps of FIG. 4. The process of FIG. 4 may begin by determining a number of clients utilizing a connection (step 402). The clients may represent devices, systems, or software applications that share bandwidth, such as a customer-end connection, wireless connection, trunk line, or so forth. In one embodiment, the bandwidth may be allocated in response to a number of devices utilizing a data connection or that are expected to utilize a network connection. For example, the bandwidth settings that are stored for initial use and allocation may be reduced where a number of devices are likely to be streaming video content simultaneously (e.g. Netflix, Hulu, Vudu content services being stream to a number of computing and communications devices).

Next, the system determines bandwidth availability and network conditions (step 404). The bandwidth availability may vary based on the number of devices determined to be utilizing a connection or network as determined in step 402. In one embodiment, the bandwidth availability may specify the bandwidth that will be allocated to the client in response to initiation of the communication session.

Next, the system updates the bandwidth settings in response to buffer utilization (step 406). In one embodiment, the buffer utilization may be categorized based on different thresholds, levels, or categories. Buffer utilization may also be utilized during a communication session to increase or decrease a bit rate and any changes are recorded to a memory, server, or database, such as a bandwidth storage server, for access by other clients and application. The bandwidth settings are updated as the client adjusts the bit rate dynamically utilizing logic and complex algorithms as are known in the art.

Next, the system determines available bandwidth settings (step 408). The bandwidth settings may vary based on the application, client, or content being streamed. The bandwidth settings may be pre-defined or selected based on user input. The video segments may be similarly established for each of the bandwidth settings or customer established. In one embodiment, the bandwidth settings for the client may differ from the bandwidth available through a communications service provider providing a network connection. In one embodiment, the highest bandwidth setting available through the communications service provider is utilized.

Next, the system saves bandwidth settings at pre-defined intervals (step 410). In one embodiment, the bandwidth settings may be saved periodically, such as every two minutes. As a result, if the client crashes or experiences errors, the most recent bandwidth setting is saved and available. The bandwidth settings may also be saved automatically in response to other conditions, such as transitions between video content, buffer utilization meeting a threshold, application changes, and so forth.

The previous detailed description is of a small number of embodiments for implementing the invention and is not intended to be limiting in scope. The following claims set forth a number of the embodiments of the invention disclosed with greater particularity.

What is claimed:

1. A method for selecting an initial bandwidth setting, the method comprising:
   determining a client is initiating a communication session to receive streaming content from a content source, wherein the streaming content is stored as a plurality of content segments and a manifest describing the plurality of content segments and their order, each of the plurality of content segments being available in a plurality of bit rate encodings;
   determining an identifier for the client;
   determining network conditions for the client;
   selecting a bandwidth setting for the client utilizing the network conditions and a previous bandwidth setting saved in a memory;
   initiating the communication session for the client utilizing the bandwidth setting: wherein initiating the communication session for the client comprises streaming a first content segment having a first bit rate encoding based on the bandwidth setting;
   and updating the bandwidth setting to change a bit rate of the streaming content, based on buffer utilization at one or more devices in a network connection between the client and the content source, wherein changing a bit rate of the streaming content comprises streaming a second content segment of the content, the second content segment having a different bit rate encoding than the first content segment;
   storing at least one of the updated bandwidth setting, the buffer utilization, and a bandwidth history in memory.

2. The method according to claim 1, wherein the client is a video streaming application.

3. The method according to claim 1, wherein the network conditions include a type of data connection being utilized by the client.

4. The method according to claim 1, wherein the network conditions include determining a number of clients sharing a network connection with bandwidth limitations.

5. The method according to claim 1, wherein the communication session is initiation of a video session.

6. The method according to claim 1, further comprising: updating the memory with a bandwidth setting in response to determining the client is functional at the bandwidth setting.

7. The method according to claim 1, further comprising: determining an identifier associated with the client to determine the previous bandwidth setting associated with the client.

8. The method according to claim 1, wherein the identifier is a MAC address associated with the client.

9. The method according to claim 1, further comprising: storing the bandwidth setting at a predefined interval.

10. A server for selecting a bandwidth setting, comprising:
a processor for executing a set of instructions; and a memory for storing the set of instructions, wherein the set of instructions are configured to:
determine a client is initiating a communication session to receive streaming content from a content source, wherein the streaming content is stored as a plurality of content segments and a manifest describing the plurality of content segments and their order, each of the plurality of content segments being available in a plurality of bit rate encodings;
determine an identifier associated with the client;
determine network conditions for the client;
select a bandwidth setting for the client utilizing the network conditions and the identifier associated with the client, wherein the identifier is associated with a previous bandwidth setting saved in a memory;
initiate the communication session for the client utilizing the bandwidth setting wherein initiating the communication session for the client comprises streaming a first content segment having a first bit rate encoding based on the bandwidth setting; and
update the bandwidth setting to change a bit rate of the streaming content, based on buffer utilization at one or more devices in a network connection between the client and the content source, wherein changing a bit rate of the streaming content comprises streaming a second content segment of the content, the second content segment having a different bit rate encoding than the first content segment;
store at least one of the updated bandwidth setting, the buffer utilization, and a bandwidth history in memory.

11. The server according to claim 10, wherein the client is a video streaming application, and wherein the network conditions include a type of data connection being utilized by the client.

12. The server according to claim 10, wherein the network conditions include determining a number of clients sharing a network connection with bandwidth limitations.

13. The server according to claim 10, wherein the memory is a database accessed by the server to determine the previous bandwidth setting.

14. The server according to claim 10, wherein the bandwidth setting is selected for each new communication session, and wherein the communication session includes at least video streaming.

15. The server according to claim 10, wherein the server is the content source.

16. A system for retrieving a bandwidth setting, the system comprising:
a server configured to determine a client is initiating a communication session to receive streaming content from a content source, determine an identifier associated with the client, determine network conditions for the client, select a bandwidth setting for the client utilizing the identifier associated with the client, the network conditions for the client, and a previous bandwidth setting utilized by the client, initiate the communication session for the client utilizing the bandwidth setting, and update the bandwidth setting to change a bit rate of the streaming content based on buffer utilization at one or more devices in a network connection between the client and the content source; and
a database in communication with the server, the database is operable to store the updated bandwidth setting utilized by the client;
wherein the streaming content is stored as a plurality of content segments and a manifest describing the plurality of content segments and their order, each of the plurality of content segments being available in a plurality of bit rate encodings;
wherein initiating the communication session for the client comprises streaming a first content segment having a first bit rate encoding based on the bandwidth setting;
and wherein changing a bit rate of the streaming content comprises streaming a second content segment of the content, the second content segment having a different bit rate encoding than the first content segment.

17. The system according to claim 16, wherein a plurality of bandwidth settings are stored in the database, and wherein the plurality of bandwidth settings are associated with each of a plurality of clients utilizing each of a plurality of identifiers for initiating communications sessions.

18. The system according to claim 16, wherein the identifier is a MAC address.

19. The system according to claim 16, wherein the network conditions include at least a number of clients sharing a network connection with bandwidth limitations and a type of connection utilized by the client.

20. The server according to claim 16, wherein the server is the content source.

* * * * *